UNITED STATES PATENT OFFICE.

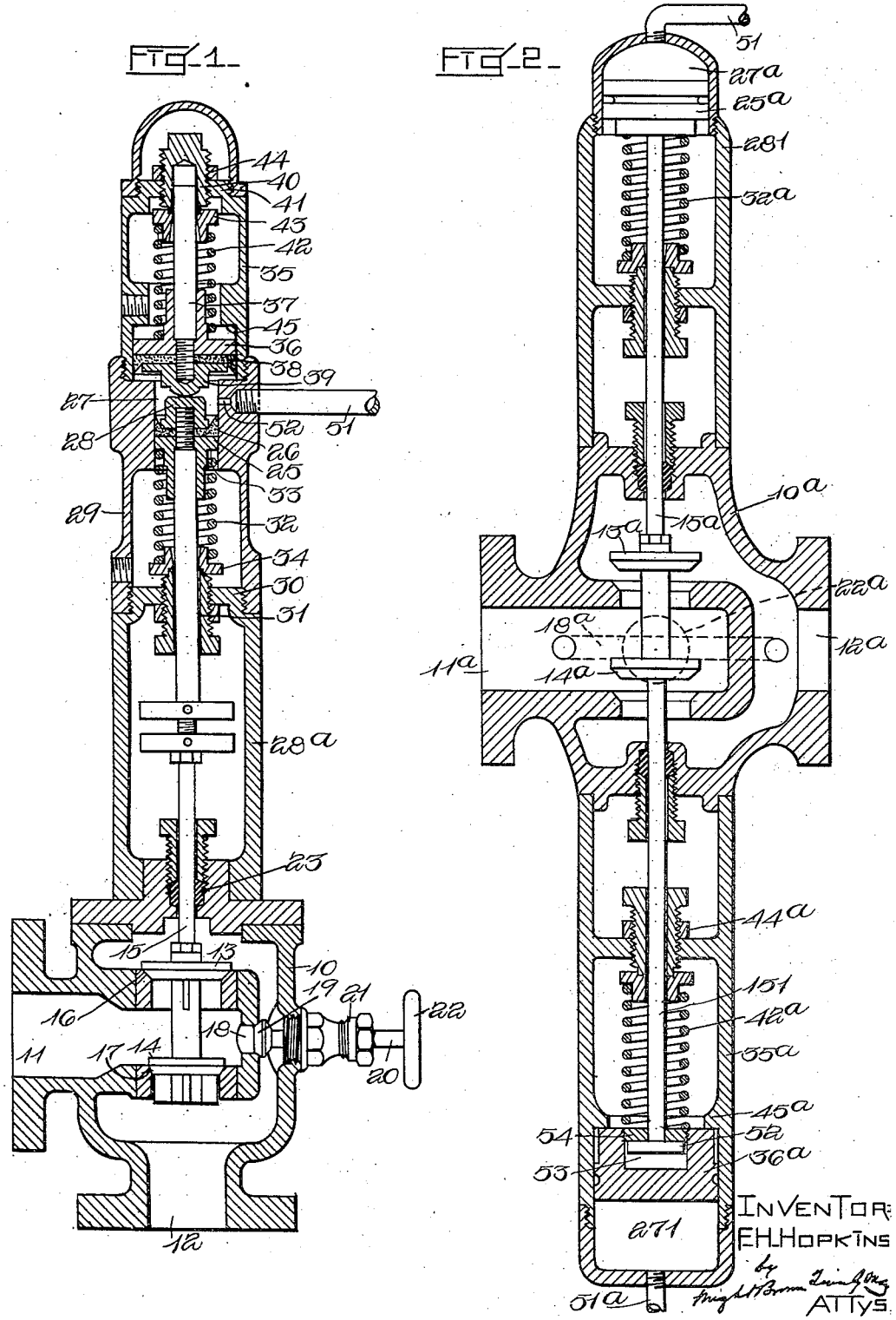

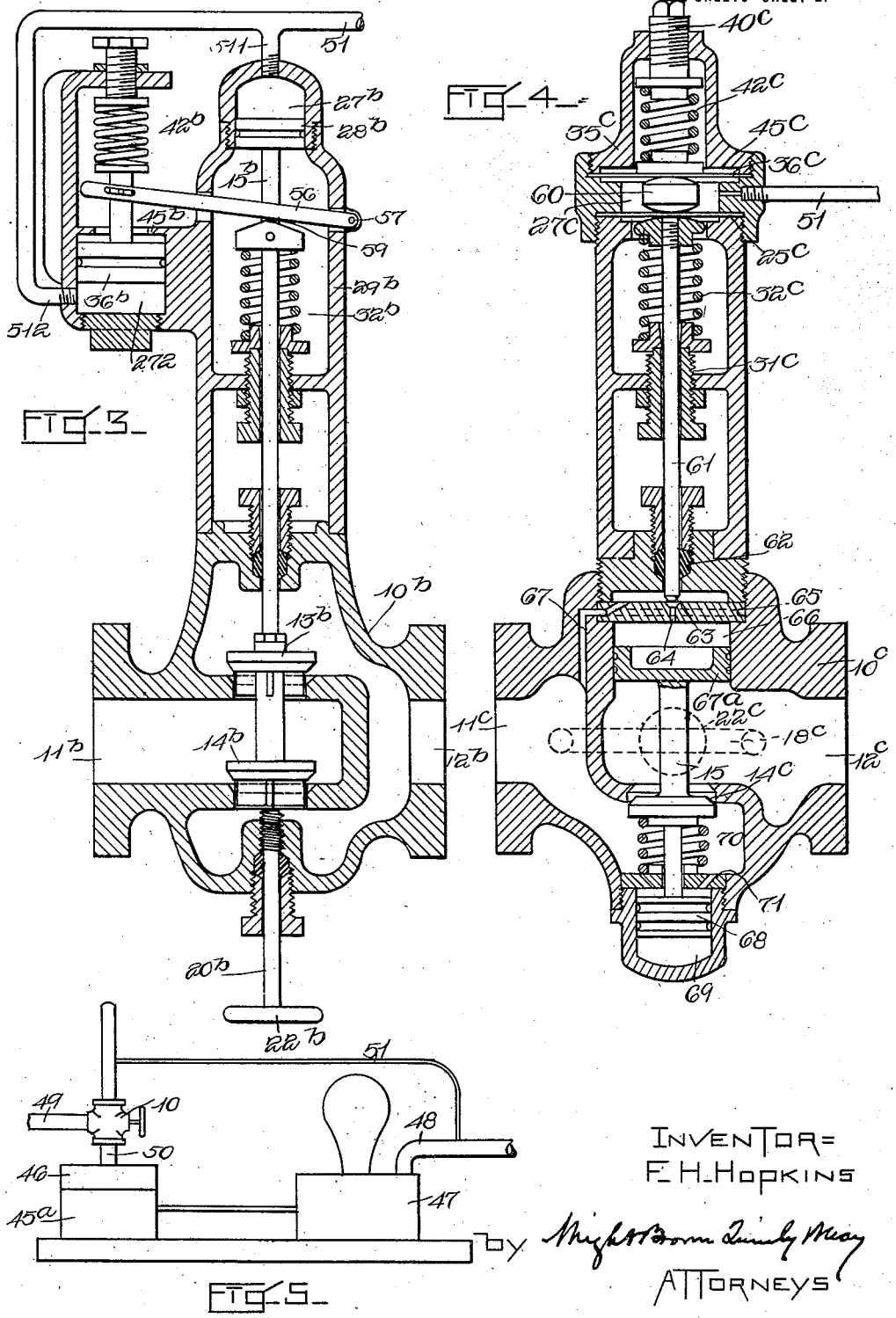

FRANK H. HOPKINS, OF SOMERVILLE, MASSACHUSETTS, ASSIGNOR TO AMERICAN STEAM GAUGE & VALVE MANUFACTURING COMPANY, OF BOSTON, MASSACHUSETTS, A CORPORATION OF MASSACHUSETTS.

PRESSURE-REGULATING DEVICE.

1,305,365.     Specification of Letters Patent.     Patented June 3, 1919.

Application filed September 13, 1915. Serial No. 50,538.

*To all whom it may concern:*

Be it known that I, FRANK H. HOPKINS, of Somerville, in the county of Middlesex and State of Massachusetts, have invented certain new and useful Improvements in Pressure-Regulating Devices, of which the following is a specification.

The present invention relates to pressure regulating devices adapted to receive a fluid under pressure and to deliver the same at a lower pressure, which may be either a definite or a variable pressure, according to the service to be performed by the delivered fluid. The general object of the invention is to provide an apparatus of the sort indicated which shall be of the simplest construction and at the same time of great efficiency, with the least liability to derangement. More specifically, my object has been to provide a pressure regulator which may be used as a governor for a steam pump or compressor, controlled by the pressure of the liquid or other fluid delivered by the pump, and equipped with an emergency stop operative to cause the governor to shut off entirely the steam or other working fluid in case of breakage or a leak in the line supplied by the pump; and to realize in such a governor the general objects above set forth.

While the invention is particularly adapted to the specific purpose above stated, it is not limited to that purpose or use, but is applicable to any use which requires a regulated reduction in pressure of any fluid, whether such fluid be steam to be utilized in driving a motor or otherwise, or any other vapor, gas, or liquid, for whatever use intended, and therefore I do not limit the invention to a governor for steam pumps.

The invention consists in the means for accomplishing the foregoing objects described and set forth in the following specification and claims, and in all the modifications and equivalents thereof which contain the principles and have essentially the mode of operation of the particular means therein set forth. In the drawings forming a part of this application, I have shown four specific constructions embodying the principles of my invention, intending thereby to indicate to some extent the scope of the invention for which I claim protection, but without intent to limit the same to any one of such constructions, or in any other manner than as indicated by the express terms of the claims.

Figure 1 of these drawings shows in longitudinal section one specific embodiment of the invention;

Figs. 2, 3 and 4 show similarly a second, third and fourth form or construction respectively containing the same principles and equivalent elements; and Fig. 5 shows diagrammatically the mode of application of the governor to a steam pump.

The same reference characters indicate the same parts in all figures.

Referring first to Fig. 1, 10 represents a valve casing having openings 11 and 12 adapted for connection with pipes or other fittings through which fluid may flow. For the purposes of this description it may be assumed that the passage 11 is the inlet and 12 the outlet for the steam or other fluid, although the description of these passages may be reversed and the steam considered to flow in the opposite direction. In the valve casing is a balanced valve comprising two valve disks 13 and 14 which are connected to a stem 15 and are adapted to coact with seats 16 and 17 respectively. So far as this feature of the apparatus is concerned the construction may be that of any balanced valve. It is not strictly necessary, however, that the valve should be a balanced one, but this type is preferred on account of the fact that it may be more easily and accurately regulated. A by-pass 18 is provided between the valve seats and opens into the internal chamber of the valve casing in communication with the outlet. This by-pass is covered by a valve 19 of which the stem 20 passes through a stuffing box 21 in the side of the valve casing and is provided with a hand wheel 22 for manual operation. This valve is normally closed, but it can be opened at will to start the pump or other motor driven by fluid which passes through the regulator.

The valve stem 15 passes through a stuffing box 23 in the top of the valve casing to a considerable distance from the latter and has secured upon its end a piston 25 provided with a packing washer 26 which fits the walls of a chamber 27 formed in a structure which is mounted on the valve casing. The piston and packing washer are secured by a nut 28 screwed upon the end of the valve stem.

The structure in which the chamber 27 is formed comprises a frame 28ᵃ attached to the valve casing 10, and a tube 29 secured upon the upper end of the frame 28ᵃ. The latter has an end wall 30 through which is threaded a bushing 31. The valve stem passes through the bushing and is guided thereby and the bushing also serves as a means for adjusting the tension of a spring 32 which surrounds the valve stem, pressing against a shoulder 33 on the piston 25 and reacting against a thimble 34 which rests on the end of bushing 31. Spring 32 tends to raise the valve, that is to unseat it and the threaded bushing 31 serves to regulate the force with which the spring thus acts.

In using the terms "frame" and "cylinder" to describe the parts 28 and 29 I have not intended to imply that such parts must be of any particular construction and form. The function of these parts is to provide and support a chamber such as the chamber 27, to guide the valve stem and to provide an adjustable abutment for the spring 32. Any structural parts capable of serving these purposes may be used instead of the specific parts here shown.

Attached to the upper end of the tube 29 is a guide or frame member 35 of which the end is open and in communication with the chamber 27 and of cylindrical form. In this open end is fitted a piston 36 on the stem 37, the piston being packed by a washer 38 which is secured by a nut 39 screwed upon the stem 37. This stem passes into a cavity in a thimble 40 which is threaded and passes through the end wall 41 of the part 35 engaging with threads in the latter. A spring 42 surrounds the stem 37 and bears on piston 36 reacting against a collar 43 which abuts against the thimble 40. The tendency of the spring 42 is to press the piston 36 downward, that is, in the opposite direction to that in which the piston 25 is pressed by the spring 32. The tension of spring 42 may be regulated by adjusting the thimble 40, the adjustments of which are made secure by a lock nut 44 screwed upon the same. A stop shoulder 45 is provided within member 35 to limit the extent to which piston 36 may be raised.

It will be noted that the piston is arranged to bear against the valve stem 15 (through the nuts 39 and 28), whereby the spring 42 tends to close the valve; and also that the area of this piston is greater than the area of piston 25. The tension of spring 42 is adjusted to balance spring 32 when the valve is closed and when no fluid pressure acts on the pistons.

Attention is directed to Fig. 5 for an explanation of one mode of use of the apparatus above described. In this figure a steam pump is shown diagrammatically, having a steam cylinder 45ᵃ, a valve chest 46 and a compression cylinder 47. 48 represents a pipe for conducting the water or other fluid delivered by the pump. The regulator is connected to the steam pump in such a manner that the steam for operating the pump passes through it. 49 represents the pipe conducting steam to the regulator, and 50 represents the pipe leading from the regulator to the valve chest of the pump. 51 is a branch connection leading from the delivery pipe 48 of the pump to the chamber 27 of the regulator. This pipe is also indicated in Fig. 1 as leading to a port 52 which opens into the chamber 27.

The operation of the regulator or governor will now be understood. When the pump is not in operation and there is no pressure in the delivery line 48, the parts of the governor assume the position shown in Fig. 1 and the main valve is closed. The pump may be started by opening the by-pass valve 19 which allows steam to flow to the pump. As soon as the pump has developed pressure in the line 48, such pressure is transmitted through the branch 51 to the chamber 27. Both piston 25 and 36 are exposed to this pressure and the piston 36 is raised against the resistance of the spring 42 until it abuts against the stop shoulder 45. Thereby the pressure of spring 42 tending to close the main valve is taken away from the valve stem 15 and the spring 32 is enabled to open the valve against the pressure of the fluid acting on the piston 25, until such pressure balances the spring. A condition of equilibrium is then established in which the piston 25 is enabled to act as a governor for the pump, being raised by the spring to open the steam valve more widely when the fluid pressure acting on the piston is decreased by an increase in the demand upon the pump, and being depressed by the fluid pressure to partially close the steam valve to a greater or less extent when the demand diminishes and the pressure developed by the pump is greater than required. The adjustment of the spring 32 previously described determines the pressure at which the governor will cause the water or other fluid to be delivered by the pump.

If the delivery line from the pump should burst or leak, so that the pressure therein is greatly diminished, the piston 36 is no longer supported against the spring 42, but is depressed by the spring into contact with the nut 28 and closes the steam valve, causing the pump to be stopped. Piston 36 is an emergency stop or lock which is held out of the way when the system is in working order, allowing the governor piston to operate without interference, but coming into action to shut the main valve upon the occurrence of any accident which would cause the pump to race and the fluid passing from the pump, or that flowing by the main valve, to escape if the emergency stop were not there.
Adjustment of the tension of spring 42 in connection with the area of piston 36 determines the pressure to which the fluid delivered by the pump, or the fluid passing the main valve when the latter is used as a reducing valve, may be reduced before the emergency stop will come into action.

In analyzing the principles involved in the apparatus, it will be seen that essentially the pistons 25 and 36 are movable walls forming parts of a chamber or chambers to which the pressure developed by the pump is conducted, such walls being displaceable by such pressure. The piston 36 is also a lock for the regulating or governing piston 25 which is adapted to be made inoperative by the pressure of the pump when such pressure is within the normal limits, and to become operative when such pressure is less than the lowest limit of normal operation.

It is not essential that the pistons 25 and 36 should be arranged in proximity to one another or that both should be in the same chamber. Fig. 2 illustrates an arrangement in which corresponding pistons are in different chambers remote from each other although in line. In the latter figure a modified construction is shown having elements equivalent to those shown in Fig. 1 and designated by the same numerals applied to Fig. 1, but distinguished by the exponent "a." The governing piston 25$^a$ is contained in a chamber 27$^a$ supported by a frame 281, while the locking piston 36$^a$ is in a separate chamber 271 on the opposite side of the valve casing 10$^a$ and in alinement with the chamber 27$^a$. The valve stem has an extension 151 extending through the guide 35$^a$ to the stop piston 36$^a$ and provided with a head 52 which is contained in a recess 53 in the piston 36$^a$ and is overlaid by a flange 54 in the form of an annular nut screwed into the end of the recess 53. Such recess is enough deeper than the head 52 to allow a sufficient amount of lost motion of the valve stem relatively to the piston. The chambers 27$^a$ and 271 are in communication through the branches 51 and 51$^a$ respectively with the delivery pipe of the pump so that both pistons 25$^a$ and 36$^a$ are acted upon by the same pressure. Piston 36$^a$ is of larger area than piston 25$^a$ so that when exposed to this pressure it is raised against the tension of spring 42$^a$ until it abuts against the stop shoulder 45$^a$ whereupon the governor piston 25$^a$ is permitted to operate as previously described to regulate the pressure at which the working fluid is supplied to the pump. The lost motion permitted by the cavity 53 allows the piston 25$^a$ with the valve stems to move back and forth within the required limits. When the pressure in the delivery pipe drops below the lowest predetermined limit, piston 36$^a$ is depressed by its spring and the flange 54 bears on the head 52 to draw down the valve stem and close the steam valve.

Fig. 3 shows a further modification which differs from the construction previously described in that the chamber for the emergency lock, here designated 272, is placed at one side of the casing or frame 29$^b$ in which the pressure chamber 27$^b$ containing the governing piston 28$^b$ is located. The chambers 27$^b$ and 272 are in communication through branches 511 and 512 of the pipe 51 with the delivery line from the pump. 45$^b$ represents the stop which limits the movement of the locking piston 36$^b$ under the pressure developed by the pump. This piston is connected with an arm 56 which is pivoted on a stud 57 at the side of the frame 29$^b$ and crosses the valve stem 15$^b$ directly above a head 58 on the latter which is provided with a knife edge bearing 59. When the emergency lock piston is depressed by its spring 42$^b$ the arm 56 is pressed down against the head 58 and exerts pressure on the main valve which closes the latter. The leverage through which piston 36$^b$ and spring 42$^b$ act upon the valve is a factor having the same effect as the difference in area of the pistons in the previously described forms of the device, to permit release of the emergency stop by fluid pressure of less intensity than required to seat the valve by acting directly on piston 28$^b$. An increase of area in the stop piston over the governing piston, with a spring to correspond, may, however, be employed at the same time.

In each form of the invention heretofore described, the members which are directly acted upon by the pressure developed in the pump, and constitute positive movable walls of a pressure chamber or chambers, are pistons. It is not essential, however, that pistons be employed for that purpose, for diaphragms and other equivalent mechanical elements may be as well used for the same purpose and with the same ultimate effect. Fig. 4 is here presented to illustrate the use of diaphragms for serving the purposes of the pistons hereinbefore described. In the latter figure 25$^c$ and 36$^c$ represent metal diaphragms which form the movable bounding walls of the pressure chamber 27$^c$, and corresponding generally to the pistons 25 and 36, Fig. 1; diaphragm 36$^c$ being of larger area than diaphragm 25$^c$. Springs 32$^c$ and 42$^c$ are arranged and act in essentially the same manner as the springs 32 and 42 of Fig. 1. They are also adjustable in essentially the same manner by the adjusting screws 31$^c$ and 40ᶜ respectively. A block 60 is arranged between the diaphragms, being made fast to one of them and resting loosely against the other. In the construction shown the block is made fast to the diaphragm 36ᶜ.

Diaphragm 25ᶜ is the governing member of the apparatus which acts, however, not directly upon the main valve 14ᶜ, but indirectly through a pilot valve, for the reason that the movement of the diaphragm may not be sufficient to give as long a travel by direct connection with the steam valve as is necessary for some purposes. Accordingly the diaphragm 25ᶜ is connected to a valve stem 61 which passes through a stuffing box 62 and carries a valve 63 adapted to open and close a port 64 in a block 65 which forms the head of a steam chamber 66. Steam flows from the inlet 11ᶜ through a by-pass 67 to the space on the outer side of head 65 and thence through the port 64, when the valve 63 is open, into the chamber 66. A piston 67ᵃ in the latter is connected to the valve stem 15ᶜ of the main valve 14ᶜ. It will be evident from the drawing that with the arrangement here shown the steam admitted to chamber 66 acts to open the valve 14ᶜ. To this valve is connected a damping piston 68 working in a dash pot chamber 69 which contains a fluid sufficiently viscous to retard the movements of the valve. A spring 70 presses against the valve in the direction which tends to close it and reacts against a perforated plate 71 which overlies the upper end of the dash pot chamber 69.

The operation of this form of the invention is essentially the same as that already described, the diaphragm 36ᶜ being displaced by the pressure developed by the pump until it is arrested by the shoulder 45ᶜ formed in the thimble 35ᶜ. This displacement of the diaphragm frees the other diaphragm 25ᶜ which is then permitted to rise under the pressure of spring 32ᶜ opening the pilot valve 63 and admitting steam to chamber 66 to open the main valve 14ᶜ. When the pressure in chamber 27ᶜ overcomes spring 32ᶜ and the pilot valve is wholly or partly closed, thereby shutting off the steam acting on piston 67 to a greater or less extent and allowing the spring 70 to wholly or partially close the main valve. As the piston 67ᵃ is not packed, and is made to slide freely in the cylinder 66, a certain amount of leakage of steam past the piston is permitted. This leakage is not very great and is not enough to affect the action when steam is allowed to pass through the port 64, but it is enough to permit equalization of pressures on opposite sides of the piston when the pilot valve is entirely closed, so that the main valve may be closed, and also to permit partial closing of the main valve when the admission of steam through the port 64 is reduced. In case the pressure in the chamber 27ᶜ should fall below the predetermined limit, the spring 42ᶜ is enabled to displace the diaphragm 36ᶜ and to act through the block 60 upon the pilot valve and entirely close the latter. It is equally feasible to substitute diaphragms for either or both of the pistons in each of the arrangements shown in Figs. 1, 2 and 3 and the manner in which such substitution can be readily made will be apparent by a comparison of Figs. 1 and 4. The modification exemplified in Fig. 4 and consisting of the arrangement of a pilot valve for governing the main valve is not specifically claimed herein, but is made the subject of a separate application filed by me.

In the foregoing description I have assumed the position of the governor as being upright and have used descriptive terms accordingly. Such terms so far as they indicate direction with respect to the horizon are not to be considered as limitations in any sense. The instrument does not depend to any degree upon gravity, but upon fluid pressures and springs for its operation and is therefore operative in any position whether vertical or horizontal or inverted or otherwise. Accordingly all terms herein used indicating direction are to be considered as relating simply to the showing of the apparatus in the present drawings.

I have not intended, by describing the manner of employment of my apparatus as a governor for steam pumps, to limit the scope of the invention in any way. The main valve of the apparatus is essentially a throttle valve or reducing valve, and may be used as such in any situation where a reduction in pressure of fluid is required for any purpose. The pilot valve shown in Fig. 4 is also a reducing valve, which corresponds with the main valve in Figs. 1, 2 and 3. The fluid under pressure for governing the reducing valve may be either that issuing from the valve, or another fluid, as in the case of a steam pump here described; in either case the pressure of the governing fluid bears a direct relation and is in direct proportion to the pressure of the fluid passing the regulating valve.

I am aware of patent numbered 1,077,090 to Robert B. McGowan granted October 28, 1913, for a pump governor. I do not claim as my invention the emergency stop suggested in said patent, but my claim of invention is directed to the features in which my apparatus is distinguished from and improved upon the McGowan apparatus.

What I claim and desire to secure by Letters Patent is:

1. A pressure regulating apparatus comprising a valve having an inlet and an outlet, a pressure controlled governing member for actuating said valve and opening or closing the same in accordance with the pressures to which the governor is exposed, and a locking means exposed to the pressure acting on the governor and adapted to close said valve but normally held by such pressure out of the valve closing position.

2. A pressure regulating apparatus comprising a pressure regulating valve, a pressure chamber outside of said valve having two opposed movable walls, one of said walls being of greater area than the other, springs acting upon said walls tending to move each toward the other and in opposition to the force exerted on the respective walls by fluid pressure in said pressure chamber, the wall of smaller area being a governor and being adapted to cause the opening and closing of the valve in accordance with its position.

3. A pressure regulating apparatus comprising a valve, a governor for the valve exposed to fluid pressure and adapted to change its position in accordance with fluctuations in such pressure, means for causing displacement of the valve corresponding to those of the governor, and a locking device or emergency stop arranged to act upon said governor and hold the same in the position assumed when the valve is closed, said emergency stop being displaceable by the controlling fluid pressure and being normally held thereby out of connection with the governor whereby the latter is normally free to act in the designed manner without interference.

4. A pressure regulator comprising a regulating valve having a stem, a pressure chamber outside of said valve containing a regulating pressure, one of the walls of said chamber being movable and being connected to the valve stem, yielding means acting externally on said movable wall tending to move the same inwardly, and a normally inoperative locking device exposed to the same regulating pressure and adapted to close the valve when the said regulating pressure drops below a predetermined degree.

5. A pressure regulating apparatus comprising a valve adapted to permit a regulated, variable flow of fluid, a chamber external to the valve containing a fluid under a pressure which is dependent upon the pressure at which the fluid first mentioned issues from the valve, said chamber having a movable wall, yielding means tending to cause said valve to open, means whereby the said movable wall tends to cause the valve to close when moved by the fluid pressure acting thereon, a stop acted upon by the same fluid pressure and normally rendered inoperative when such pressure is greater than a given amount, and means for causing said stop to close the valve when such pressure diminishes below such amount.

6. A pressure regulating apparatus comprising a valve casing having an inlet and an outlet, a valve arranged between the said inlet and outlet adapted to regulate the flow of fluid and the pressure at which the fluid issues from said outlet, a movable governing member connected to the valve and exposed to a fluid pressure the intensity of which is affected by the pressure of the fluid issuing from the valve, a spring acting on said governing member in opposition to the fluid pressure, a spring constantly exerting a pressure tending to close the valve, and means actuated by the said fluid pressure for preventing operation of said spring while such fluid pressure exceeds a certain intensity.

7. A pressure regulating apparatus comprising a valve, a pressure controlled governor for shifting said valve to enlarge or restrict the passage controlled thereby, and a pressure controlled device additional to and separate from said governor for closing the valve when the controlling pressure becomes of less than a given intensity.

8. A pressure regulating apparatus comprising a valve, a displaceable stop yieldingly urged to close said valve, separate yielding means tending to open the valve, a governor connected with the valve and exposed to fluid pressure acting in opposition to said yielding means, and means for causing the said fluid pressure to displace said stop out of the valve closing position.

9. A pressure regulating apparatus comprising a valve, a stop constantly urged in a yielding manner to engage and hold the valve in closed position, a governor pressed in one direction by fluid pressure against yielding resistance and arranged to govern the valve so as to enlarge or restrict the passage controlled thereby, and means whereby the said fluid pressure is enabled to displace said stop into a position in which opening of the valve, and movement thereof, is permitted.

10. A pressure regulating apparatus comprising a valve, a seat with which said valve coöperates, a stem connected to the valve, a controlling piston secured to said stem forming one wall of a chamber containing fluid under pressure, a spring acting on said piston oppositely to the pressure thereon of the fluid, a second piston of greater area than the first piston acted upon by the same pressure fluid, and a spring of greater power than the first spring pressing on the second piston oppositely to the pressure fluid, the second piston being arranged to hold the valve in closed position except when the pressure of the governing fluid exceeds a certain given degree of intensity.

11. A pressure regulating apparatus comprising a throttling valve, two pistons of respectively different areas exposed to the pressure of the same controlling fluid under pressure, and springs acting on said pistons in opposition to the pressure of the fluid, the smaller piston being in rigid connection with the valve, and the larger piston being urged by its spring into a position where it closes the valve, and being displaceable from that position by any pressure of the controlling fluid which is great enough to overcome said spring.

In testimony whereof I have affixed my signature.

FRANK H. HOPKINS.